(No Model.)

F. J. MELOUNEK.
CHOPPING MACHINE.

No. 427,594. Patented May 13, 1890.

Witnesses
E. L. Smith
Thomas Durant

Inventor
Frank J. Melounek
By his Attorneys
Louis Fieusev &c.

UNITED STATES PATENT OFFICE.

FRANK JOSEPH MELOUNEK, OF CHASKA, MINNESOTA.

CHOPPING-MACHINE.

SPECIFICATION forming part of Letters Patent No. 427,594, dated May 13, 1890.

Application filed September 9, 1889. Serial No. 323,363. (No model.)

*To all whom it may concern:*

Be it known that I, FRANK JOSEPH MELOUNEK, of Chaska, in the county of Carver and State of Minnesota, have invented a certain new and useful Improved Meat-Chopping Machine; and I do hereby declare the following to be a full, clear, and exact description of the same, reference being had to the accompanying drawings, forming a part of this specification, and to the figures of reference marked thereon.

My invention has for its object to provide a machine of inexpensive construction for chopping up meat, and one, too, which can be operated with the expenditure of but little power as compared with other machines of this class competent to do the same work.

I will first describe my improved machine, and then point out what I deem to be its special features of novelty in the clauses of claim at the end of this specification.

Figure 1:
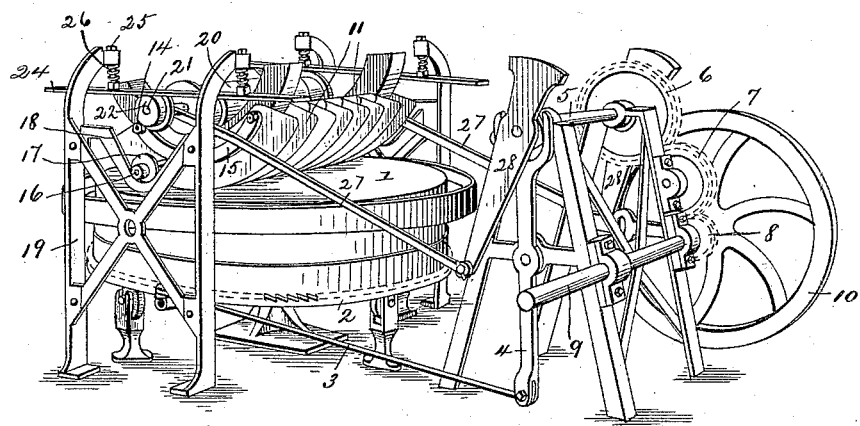
Figure 2:
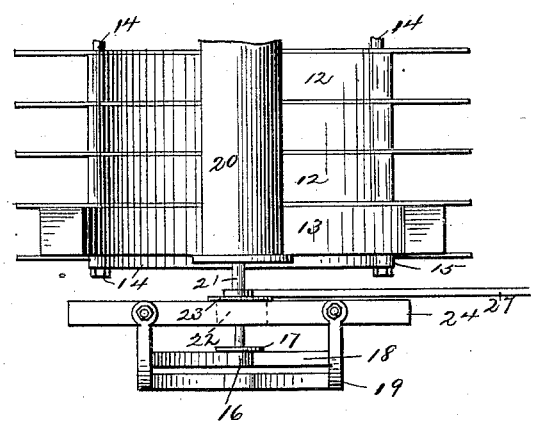

In the accompanying drawings, Figure 1 represents a perspective view of a machine embodying my invention. Fig. 2 is a top plan view of such portions of the machine illustrated in Fig. 1 as fall particularly within my invention.

Similar numbers of reference in the several figures indicate the same parts.

It is proper that I should here state that my invention relates particularly to that class of meat-choppers in which a series of rocking or oscillating knives are arranged to co-operate with a chopping-block, which is intermittingly rotated by suitable mechanism, so as to bring different portions of the meat upon the block into the path of the knives and thus cause the mass to be thoroughly chopped and minced up.

In the machine which is illustrated in Fig. 1, the chopping-block 1 and the mechanism 2, 3, 4, 5, 6, 7, 8, 9, and 10 for imparting intermittent rotation to it are of an old and well-known type and need no particular description.

The parts which embody my invention are as follows:

11 are a series of curved knives adapted to rest and rock upon a cutting-block. These knives are separated by suitable spacing blocks or pieces 12 13, (see Fig. 2,) and they are secured rigidly to said blocks by means of cross-bolts 14 or other equivalent means of fastening. The end blocks or spacing-pieces 13, I term "rockers." They not only conform to the curve of the knives, as do the other spacing-blocks, but they project above the backs of the knives and also extend beyond the ends of the knives, as shown in Fig. 1. On the outside of each of these rockers, or, to speak more correctly, on the outside of the intervening knife-blade, is secured, preferably by the bolts which hold the knives in place, a curved bar or piece 15, having an arm or short shaft 16 projecting out from near its middle and bearing upon its end a flanged friction-wheel 17, which is adapted to rest upon and be guided by a V-shaped guide or track 18, formed integral with or secured to uprights or standards 19, as shown in Fig. 1. There is of course a duplicate of the parts thus far described at each end of the machine.

20 is a weighted roller, whose shaft 21 rests upon the rockers 13 and is provided at its ends with small flanged friction-wheels or travelers 22. Flanges 23 upon the ends of the body of the roller operate to prevent said roller from moving longitudinally and becoming displaced. The flanged wheels 22 on the ends of the roller-shaft are arranged to travel beneath pressure-bars 24, which bars are suspended from the upper ends of the standards 19 by means of sliding blots 25, and are caused to exert yielding pressure upon the wheels 22 by means of coiled springs 26.

To the shaft of the large roller 20 are connected rods 27, which in turn are connected to the ends of revolving arms 28, to which motion is given by the motor mechanism of the machine in the ordinary manner.

The operation of the machine is as follows: As the connecting-bars 27 are reciprocated back and forth, the roller 20 is carried by them and is caused to travel back and forth upon the rockers 13, thereby giving to the connected knives a rocking motion upon the cutting-block. During this rocking motion the horizontal pressure-bars 24, through the wheels 22 and main roller 20, exert yielding pressure upon the knives, and if a bone or other resisting material is encountered said bars yield and permit the knives to rise without injury to them, as will be readily understood. The rocking action of the knives might tend to displace them either longitudinally or laterally, and to prevent this the flanged wheels 17 and co-operating V-shaped guides 18 are provided. These wheels move up and down the V-shaped guides as the knives are rocked, and the inclination of the guides constantly tends to keep said wheels centered or at the lowest point, thereby maintaining the knives in their proper relative positions on the block. The flanges of the roller 17 of course prevent any movement of the knives longitudinally of the roller-shaft.

Having thus described my invention, what I claim as new is—

1. The combination, with the cutting block or bed, of the curved knives, a shaft resting upon the curved backs of the knives or knife-supports, and mechanism, substantially such as described, for giving said shaft back-and-forth motion, so as to impart rocking motion to the knives, substantially as described.

2. The combination, with the cutting block or bed, of the curved knives, a shaft resting upon the curved backs of the knives or knife-supports, mechanism for giving said shaft back-and-forth movements, and horizontal bars, beneath which the ends of the shaft work, substantially as described.

3. The combination, with the cutting-block, of the curved knives, the rockers, the roller-shaft having the friction-wheels on its ends, and the spring-pressed pressure-bars, substantially as described.

4. The combination, with the cutting-block, of the curved knives, the bars or pieces connected to the knives and having the projecting arms having the flanged friction-wheels, and the V-shaped guides or tracks co-operating with said wheel, substantially as described.

5. The combination, with the cutting-block, of the curved knives, the rockers, the roller having the friction-wheels on the ends of its shaft, the spring-pressed pressure-bars, the V-shaped tracks, the friction-wheels co-operating therewith, and the pieces supporting said friction-wheels, substantially as described.

In testimony whereof I have hereunto set my hand in presence of two subscribing witnesses.

FRANK JOSEPH MELOUNEK.

Witnesses:
 LOUIS FEESER, Jr.,
 P. W. FANCY.